(12) United States Patent
Baselga

(10) Patent No.: US 11,351,616 B2
(45) Date of Patent: Jun. 7, 2022

(54) MACHINE TOOL

(71) Applicant: Comau France, Trappes (FR)

(72) Inventor: Vincent Baselga, Semalens (FR)

(73) Assignee: COMAU FRANCE, Trappes (FR)

( * ) Notice: Subject to any disclaimer, the term of this patent is extended or adjusted under 35 U.S.C. 154(b) by 470 days.

(21) Appl. No.: 16/318,773

(22) PCT Filed: Jul. 19, 2017

(86) PCT No.: PCT/FR2017/051972
§ 371 (c)(1),
(2) Date: Jan. 18, 2019

(87) PCT Pub. No.: WO2018/015662
PCT Pub. Date: Jan. 25, 2018

(65) Prior Publication Data
US 2019/0262997 A1    Aug. 29, 2019

(30) Foreign Application Priority Data

Jul. 21, 2016 (FR) ...................................... 1656971

(51) Int. Cl.
*B23C 1/12*     (2006.01)
*B25J 9/00*     (2006.01)
(Continued)

(52) U.S. Cl.
CPC ............... *B23C 1/12* (2013.01); *B25J 9/0096* (2013.01); *B25J 9/126* (2013.01); *B25J 11/005* (2013.01);
(Continued)

(58) Field of Classification Search
CPC . Y10T 409/307672; Y10T 409/308232; Y10T 409/308512; Y10T 409/309576;
(Continued)

(56) References Cited

U.S. PATENT DOCUMENTS 6,258,007 B1 *   7/2001   Kristjansson .......... H02K 7/116
                                                      477/20
8,473,103 B2 *   6/2013   Tsai ...................... G05B 19/404
                                                      700/254

(Continued)

FOREIGN PATENT DOCUMENTS

JP      61-257747 A   * 11/1986    ............. B23Q 41/00
JP      08-085091 A   *  4/1996    ............. B23Q 41/00

*Primary Examiner* — Erica E Cadugan
*Assistant Examiner* — Michael Vitale
(74) *Attorney, Agent, or Firm* — Servilla Whitney LLC

(57) ABSTRACT

The invention relates to a machine tool (M) comprising a kinematic structure (100) that moves an electric spindle (300) in a plane perpendicular to the axis of the electric spindle (300), notable in that said kinematic structure (100) is an articulated structure comprising two articulated arms (110, 120) articulated about axes of rotation parallel to the axis of the electric spindle (300), the second end (122) of the second arm (120) accepting the electric spindle (300), the translational movement of the workpiece (P) with respect to the tool (O) of the electric spindle (300) in a linear movement parallel to the axis of the electric spindle (300) being brought about by a workpiece (P) support module (200) or by a plate support module (130).

13 Claims, 19 Drawing Sheets

(51) Int. Cl.
*B25J 18/00* (2006.01)
*B23Q 1/48* (2006.01)
*B25J 9/12* (2006.01)
*B25J 11/00* (2006.01)
*B25J 13/08* (2006.01)
*B23Q 1/54* (2006.01)

(52) U.S. Cl.
CPC ............. *B25J 13/088* (2013.01); *B25J 18/00* (2013.01); *B25J 18/002* (2013.01); *B23Q 1/4885* (2013.01); *B23Q 1/5468* (2013.01); *Y10T 409/303752* (2015.01); *Y10T 409/308232* (2015.01); *Y10T 409/308512* (2015.01)

(58) Field of Classification Search
CPC ...................... B25J 9/103; B25J 9/1005–1015; B25J 9/126; B25J 11/0055; B23Q 1/4885; B23Q 1/5468; B23C 1/12

USPC .................................. 409/201, 211, 216, 235
See application file for complete search history.

(56) References Cited

U.S. PATENT DOCUMENTS

| | | | | |
|---|---|---|---|---|
| 8,849,455 | B2* | 9/2014 | Izumi | ..................... B25J 9/1641 700/254 |
| 2013/0166071 | A1* | 6/2013 | Kranz | ................. B25J 15/0095 700/260 |
| 2013/0184581 | A1* | 7/2013 | Hendriks | ............. A61B 8/4416 600/440 |
| 2015/0276436 | A1* | 10/2015 | Hasebe | ................ G01D 5/2449 74/490.03 |
| 2016/0144508 | A1* | 5/2016 | Nakajima | .............. B25J 9/1633 700/258 |
| 2016/0305527 | A1* | 10/2016 | Chuo | .................... F16H 49/001 |
| 2017/0087719 | A1* | 3/2017 | Tsuchiya | ................ B25J 9/1651 |

\* cited by examiner

The machine tool comprises a cooling circuit and/or several radiators that stabilize the kinematic structure by evacuating heat generated by the various subassemblies of which the structure is composed, such as motors, reducers, electric spindle, rotary axes, etc.

MACHINE TOOL

CROSS REFERENCE TO RELATED APPLICATIONS

This is a National Phase entry of International Application No. PCT/FR2017/051972, filed Jul. 19, 2017, which claims priority to French Patent Application No. 1656971, filed Jul. 21, 2016, the disclosures of which are incorporated herein by reference in their entireties.

FIELD OF APPLICATION OF THE INVENTION

The present invention relates to the field of machining and in particular to adaptations of the kinematic structures of machine tools which move the tools in order to perform the machining in the best conditions.

DESCRIPTION OF THE PRIOR ART

There exist in the prior art machine tools employing a kinematic structure of linear displacement and in series, such as those moving an electric tool carrier spindle in three linear axes X, Y and Z.

Thus, for example, the document FR2743741 discloses a high-speed machine tool of the spindle carrier type whose driving station utilizes a logic structure authorizing the displacements of a spindle carrier slide along three axes. This logic structure of the drive station is composed of a fixed bed consisting of a support rack situated in a vertical plane. This support rack comprises a pair of parallel transverse horizontal rails enabling, by a traditional transverse horizontal movement along an axis known as the X axis, a sliding of a vertical table forming a support frame. This vertical table is bounded at the side by a second pair of parallel vertical rails placed perpendicularly, enabling by a traditional vertical movement along an axis known as the Y axis a sliding of a headstock. This headstock is crossed by a spindle carrier slide maneuvering in a longitudinal horizontal movement along an axis known as the Z axis, normal to the preceding axes.

The movement may be actuated by linear motors.

As regards the tool installed at the end of the electric spindle, the workpiece may likewise be installed on a workpiece support structure providing not only linear, but also rotary axes of displacement.

Such a structure has the advantage of offering a broad range of rapid and precise machining. The means needed to implement this speed and this precision on each axis of movement mean that a high-speed machine tool using such a structure requires a major budget.

The cost factor becomes all the more important as the complete machining of a piece may require it to pass through a plurality of machine tools.

DESCRIPTION OF THE INVENTION

As stated, the applicant has conducted research aimed at proposing a machine tool with a less expensive structure offering a majority of the range of machining operations performed by the traditional structures and better meeting the demands for speed and precision of high-speed machining.

This research has led to the design and the realization of a machine tool comprising a kinematic structure that moves an electric spindle carrying a cutting tool, the cutting tool rotating on the axis of the electric spindle, the kinematic structure moving the electric spindle in a positioning plane perpendicular to the axis of the electric spindle, the machine tool comprising a workpiece support module.

According to the invention, said machine tool is remarkable in that said kinematic structure positions the electric spindle in the positioning plane and is an articulated structure comprising two articulated arms:
  a first arm having two ends, a first end of the first arm being mounted to pivot with respect to a plate about a single axis of rotation parallel to the axis of the electric spindle, a first means of driving in rotation comprising a rotating shaft motor ensuring the movement about this axis,
  a second arm having two ends, a first end of the second arm being mounted to pivot with respect to the second end of the first arm about a single axis of rotation parallel to the axis of the electric spindle,
a second means of driving in rotation comprising a rotating shaft motor ensuring the movement about this axis,
the second end of the second arm receiving the electric spindle, the machining taking place by a relative translation movement of the workpiece with respect to the electric spindle positioned and held fixed by the kinematic structure in said positioning plane,
the translational movement of the workpiece with respect to the tool of the electric spindle in a linear movement parallel to the axis of the electric spindle being brought about by the workpiece support module or by a plate support module.

This architecture of a machine tool is particularly advantageous in that it provides a structure articulated to two arms in order to actuate the movements of the electric spindle in the plane perpendicular to the axis of rotation of the electric spindle. An articulated structure formed by two pivoting arms is simpler and less costly to implement than the traditional stacked structures.

The only movement along a linear axis is the one that is implemented during the translation between the workpiece and the tool parallel to the axis of the electric spindle, corresponding to the so-called infeed movement.

This infeed movement is implemented either by a moving module associated with the workpiece holder module, and then the plate is fixed in translation, or by a moving module associated with the plate and then the workpiece is fixed in translation during the machining.

Of course, multiaxial articulated structures of robot type are known in the prior art. Nevertheless, these structures are not precise or rigid enough to allow their use under the precision criteria desired for the invention. This lack of precision is due to a significant number of articulations and to a not having functions divided up for each articulation.

The invention thus constitutes the result not only of a decrease in the number of displacement axes but also a selection and a division among the positioning axes implemented by the articulated structure and a working axis implemented by the translational movement. The kinematic structure proposed thus has no redundant movements.

The decrease in the number of movement axes makes it possible to economize on the associated moving means and thus reduce the positioning uncertainty.

It is not the articulated structure which realizes the axial machining forces (drilling, tapping, etc.), but rather the axis beneath the workpiece or the plate.

The use of an articulated structure furthermore allows an enlarging of the window in which a machining can be done. Moreover, an articulated structure can perform movements outside of that window, thus making easier a plurality of operations such as:

tool changing,
maintenance,
performing a machining in a different zone,
etc.

This configuration of machine tool is open and its access zone is larger, which provides great flexibility in:
the positioning of the tool magazine,
the integration of the tool magazine,
the positioning of the tool change point,
the choice of the manner of tool change,
the positioning of the plate,
the juxtapositioning of several machine tools according to the invention,
the possibilities of receiving a robotic trolley able to intervene in the machining zone or close to the latter and carrying tools able to perform various functions.

Such a configuration in fact is able to define new zones, whereas the electric spindle of a traditional machine tool moves traditionally in its machining zone. The articulated structure of the machine tool of the invention allows the electric spindle to go beyond the machining zone.

According to one particularly advantageous characteristic of the invention, the positions adopted by the electric spindle are divided into two zones, a machining zone proper and a maintenance zone where the electric spindle may undergo a variety of operations outside of machining, the mobility provided by the articulated structure allowing the electric spindle to go beyond the machining zone.

All of the movements of the electric spindle may be protected by a casing. When the machining and maintenance zones are separated into a machining zone proper, protected by a casing, and a maintenance zone, the electric spindle may be subjected to a variety of operations outside the casing zone. The mobility offered by such a structure in fact allows the electric spindle situated at the end of the articulated arms to go beyond the casing zone.

According to another particularly advantageous characteristic, the machine tool comprises a self-guided slide which cooperates with the articulated structure. This slide should be able to cooperate with the protected zone by partially entering this zone so that the articulated structure can reach it.

The fixed bed can support two articulated structures. Likewise, the workpiece holder module or modules can cooperate with one or two articulated structures.

The possibility of performing a machining in a different zone allows for having several workpiece holder modules. Thus, for example, a second workpiece holder module may be positioned in another machining zone, taking advantage of the large radius of action of the articulated arm of the machine tool.

According to another particularly advantageous characteristic of the invention, the plate is inclined, for example at forty-five degrees. The architecture of the machine tool of the invention permits this orientation, having the advantage of facilitating the handling of the machining shavings and making the machine tool more compact. The inclination further makes it possible to balance the structure, to keep the reducer of the first articulation in a preloading state in the machining zone and to improve its mechanical performance.

According to another particularly advantageous characteristic of the invention, the plate is connected to a frame by means of a quick-change coupling interface. Thus, the structure formed by the articulated arms may undergo a very rapid change as compared to what can be accomplished by a traditional moving structure. The moving structure composed of the two articulated arms thus becomes an interchangeable module thanks to the invention. The arms are folded to facilitate the exchange. Moreover, at least one of the two is outfitted with a holding hook or ring. This detachability is optimized by virtue of the fact that the articulated structure limits the number of axes of articulation and thus provides a simplified set of connectors. The selection of the axes of articulation and the limiting of their number also contribute to obtaining an interchangeable articulated structure which is not so heavy.

According to another particularly advantageous characteristic of the invention, the electric spindle carries a cleaning tool (brushing, blowing, aspiration) making it possible to clean not only the machining zone but also beyond this zone. Thus, the machine tool of the invention is able to provide self-cleaning.

The positioning capabilities of the articulated arms may also be utilized to exchange the locking tooling or mounting of the workpiece or workpieces being machined. The same holds for the workpiece holder module itself.

The patent applicant has endeavored to make this articulated structure sufficiently rigid and precise.

In order to provide the precision, rigidity and repeatability best resembling those of machine tools with movements along linear axes, the applicant has designed a machine tool having characteristics which go beyond the proper selection of axes.

Thus, according to another particularly advantageous characteristic of the invention, each axis of rotation of said articulated structure is equipped with two encoders. The presence of two encoders makes it possible to detect and correct the deformation of the axis undergoing the stress of machining, of the inertial and of gravitational forces. Thus, the error is taken into account and corrected for each articulation. To accomplish this, an encoder is associated with each end of the axis of the articulation. The control module of the machine tool thus manages two data items for each articulation, allowing it to perform the most precise movements possible by correction of errors measured between the two encoders and the theoretical setpoints for position and velocity as calculated by the numerical control system.

According to another particularly advantageous characteristic of the invention, the encoders do not have the same functions, a first encoder being used to measure the speed, while the second encoder measures the position for each axis.

According to another characteristic, the encoders are situated as far apart as possible.

According to another particularly advantageous characteristic of the invention, the axes of rotation of said articulated structure each comprise two bearings. The presence of a systematic recovery bearing for each axis of articulation optimizes the rigidity. According to one preferred embodiment, each such recovery bearing supports every second encoder. Thus, every second encoder is positioned as close as possible to a bearing, which optimizes the measurement process.

According to another characteristic of the invention, where the motors each comprise a reducer, a first encoder is associated with the motor upstream from the reducer and provides for measuring the speed and a second encoder is associated with the recovery bearing and provides for measuring the position. According to one preferred embodiment, the first encoder associated with the motor upstream from the reducer provides for measuring the velocity and the one associated with the free end provides for measuring the position. The position measurement is performed on the side with the least mechanical stress, thus avoiding errors caused by the driving process. The encoder represents the actual position after deformation According to another particularly advantageous characteristic of the invention, the second encoder for measuring the position comprises, for at least one arm, a rod sliding in a sheath and able to take into account the angular position of the other end of the arm and thus to take into account the flexural deformations of the arm whose position is being measured. Such a characteristic makes it possible to obtain the most precise possible measurement of the position.

According to another particularly advantageous characteristic of the invention, the rod and sheath assembly further comprises one or more of the following sensors:
- a linear sensor measuring the deflection parallel to the axis of articulation,
- a linear sensor measuring the radial elongation in the longitudinal direction of the arm,
- an angular sensor measuring the torsion of said arm.

These various measurements contribute to a better positioning and thus a better machining.

The use of a mechanical assembly formed by a rod and a sheath as the measurement base makes it possible to perform the measurements without their being perturbed by the various projections from a machining zone.

According to another particularly advantageous characteristic of the invention, the axes of rotation of said articulated structure are equipped with a moving means having a cycloidal reducer without backlash. The transmission of movement is thus more precise.

Another characteristic contributing to the rigidity of the structure is the shortening of the arms of which it is composed, as well as the overdimensioning in terms of the permissible load on the guide bearings of the pivot linkages.

According to another particularly advantageous characteristic of the invention, at least one articulation comprises two motors or, when the motors are associated with reducers, two motor reducers.

According to another particularly advantageous characteristic, the machine tool comprises a cooling circuit and/or several radiators stabilizing the structure by evacuating the heat generated by the various subassemblies of which it is composed, such as motors, reducers, electric spindle, rotary axes, etc.

This cooling circuit also enables a regulating of the temperature in relation to outside interferences such as the surrounding temperature, the cutting fluid, etc.

In order to expand the range of possible machining, the workpiece support module comprises one or more rotary axes in order to orient the workpiece. These different possibilities of orientation can be implemented by a bed rotating about a single axis or by a bed rotating in relation to another bed, itself rotating about another perpendicular axis. Moreover, this support module may support several workpieces.

The fundamental concepts of the invention just described above in their most elementary form, and other details and characteristics, shall emerge more clearly upon reading the following description and upon viewing the enclosed drawings, given as a nonlimiting example of several embodiments of a machine tool according to the invention.

DESCRIPTION OF PREFERRED EMBODIMENTS

Figure 1:
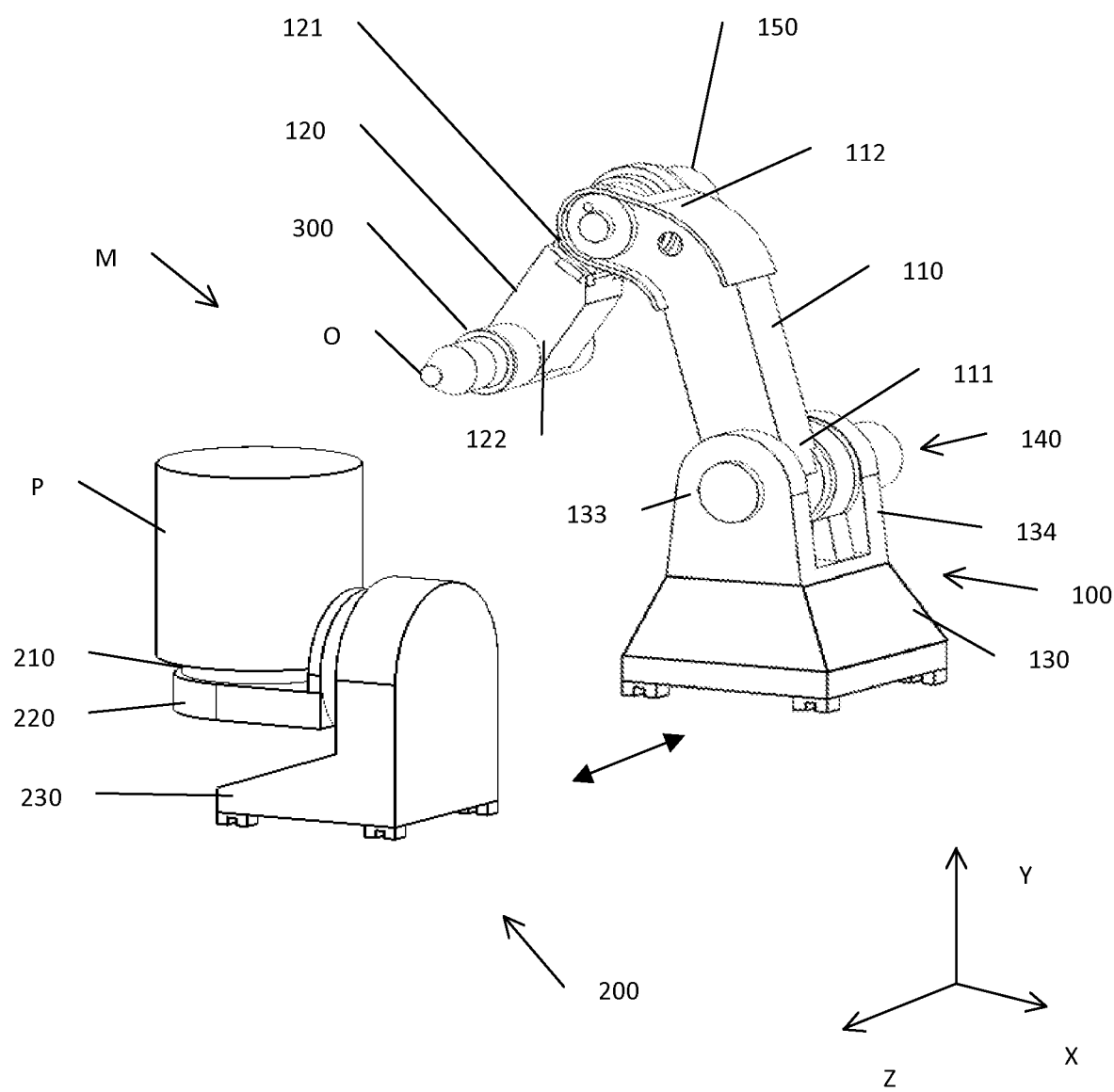
FIG. 1 is a schematic drawing of a partial exterior perspective view of a first embodiment of the machine tool of the invention.
Figure 2:
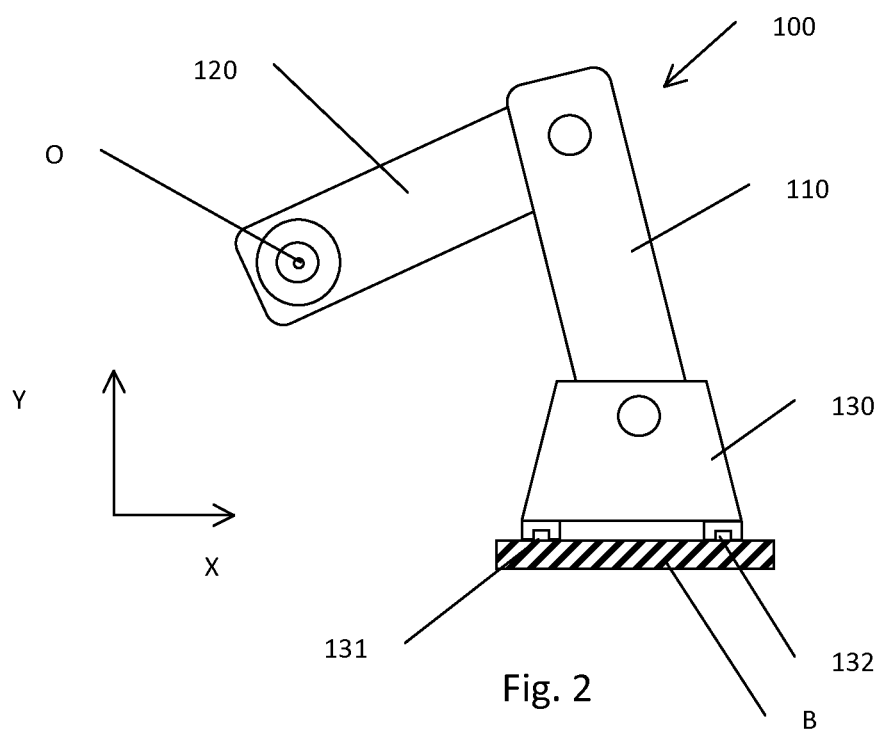
FIG. 2 is a schematic drawing of a front view of the articulate spindle support structure of FIG. 1.
Figure 3:
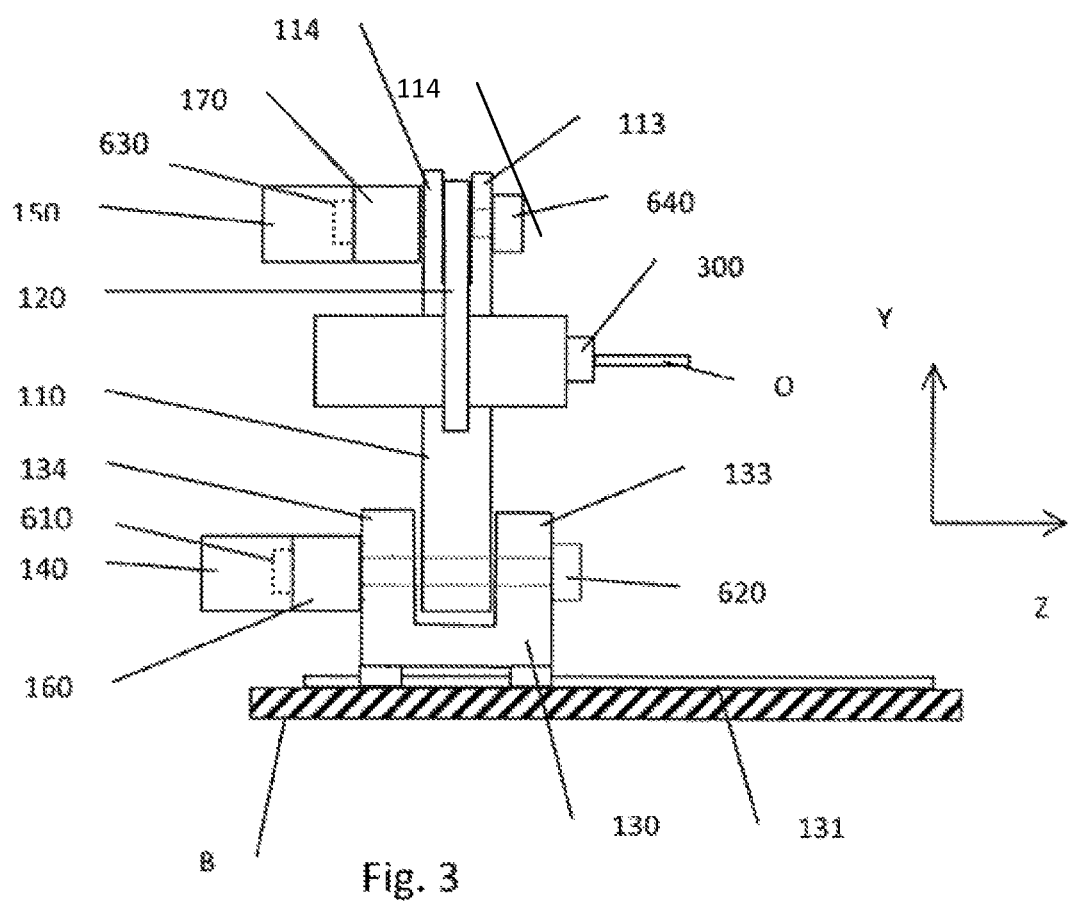
FIG. 3 is a schematic drawing of a side view of the articulate spindle support structure of FIG. 1.
Figure 4:
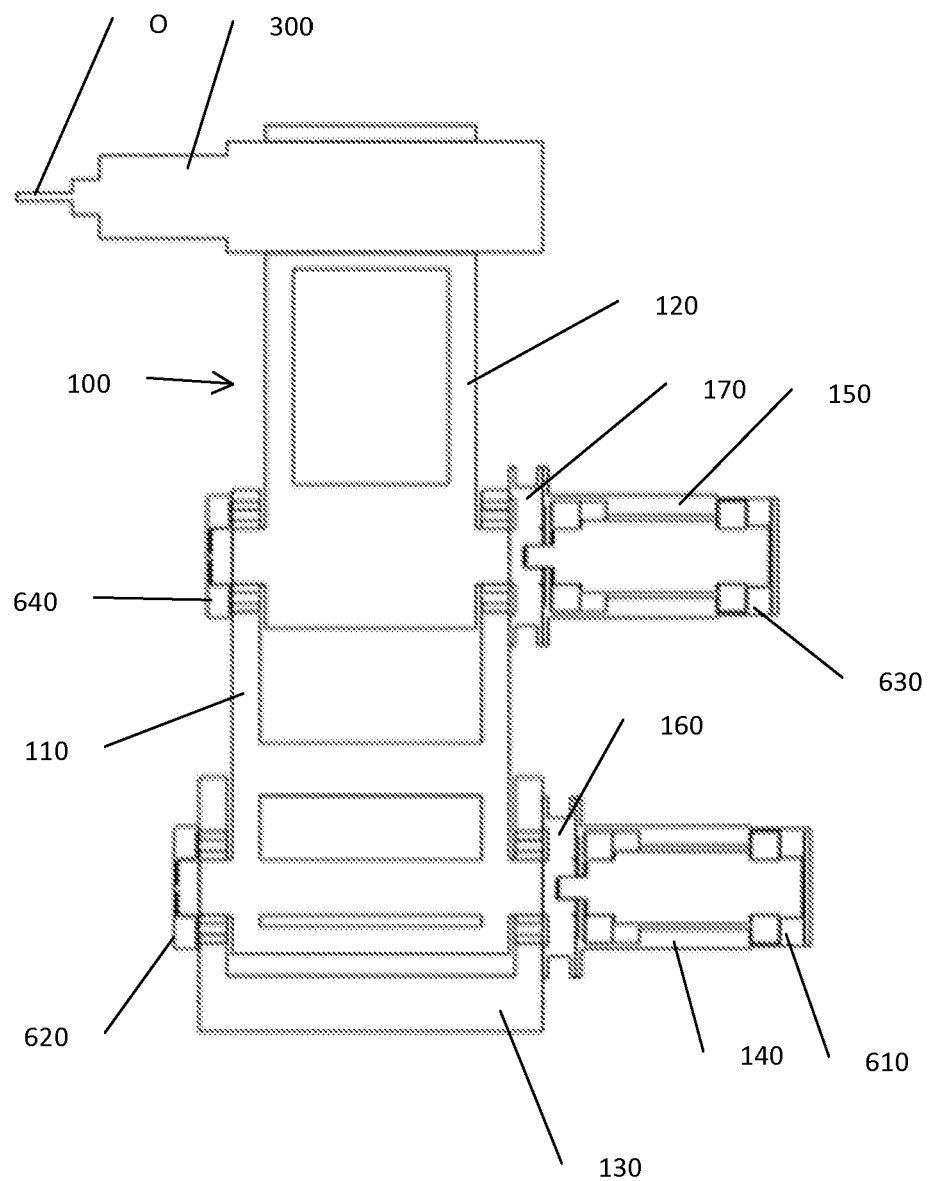
FIG. 4 is a schematic drawing of a cross sectional view with the two arms situated in the same cross section.

As illustrated in the drawings of FIGS. 1, 2, 3 and 4, the machine tool referenced overall as M comprises, arranged on a bed B, an articulated tool O holder structure 100 and a workpiece P holder module 200.

The articulated structure 100 moves an electric tool O carrier spindle 300. The electric spindle 300 drives the tool O in rotation. The axis of the electric spindle 300 is parallel to the horizontal axis Z.

This articulated structure 100 is motorized and displaces the electric spindle 300 in a plane perpendicular to the axis of the electric spindle 300, that is, in the vertical plane perpendicular to the Z axis and defined by the X and Y axes.

According to the invention, said articulated structure 100 comprises two arms 110 and 120.

The first arm 110 has two ends 111 and 112 with a first end 111 guided in rotation relative to a plate 130 about a single axis of rotation parallel to the Z axis. A first means for driving in rotation 140 ensures the moving of said arm 110 about this axis.

The second arm 120 has two ends 121 and 122 with a first end 121 that is guided in rotation relative to the second end 112 of the first arm 110 about a single axis of rotation parallel to the Z axis. A second means of driving in rotation 150 provides for the moving of said arm 120 about this axis.

The second end 122 of the second arm 120 receives the electric spindle 300 in fixed fashion. According to the invention, the axes of rotation of the tool O, and the articulation of the arms 110 and 120, are parallel to each other and thus to the Z axis.

The translation of the workpiece P toward the tool O of the electric spindle 300 in a linear movement parallel to the Z axis for purposes of machining may be provided in various ways.

Figure 6:
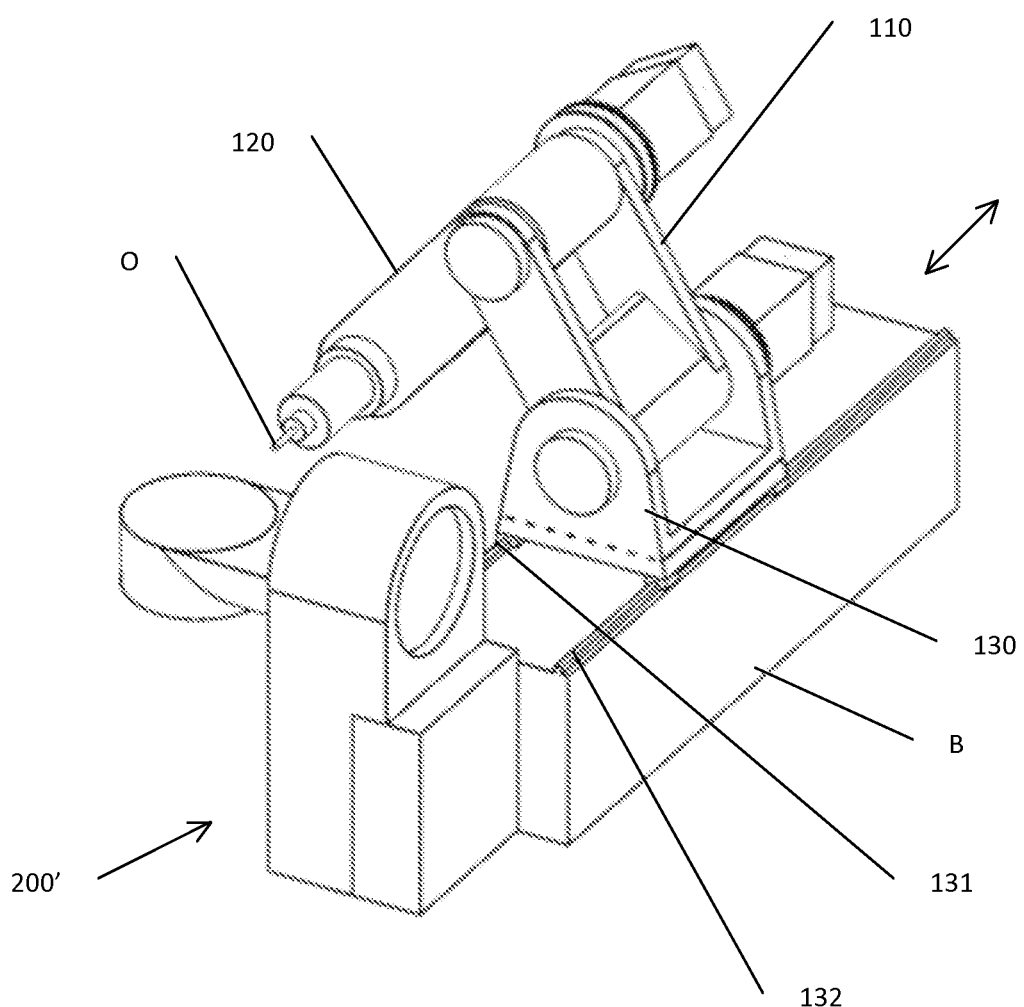
FIG. 6 is a schematic drawing of a perspective view of another embodiment of the machine tool with movable plate and comprising a workpiece holder module.

Either, for example as illustrated in the drawing of FIG. 6, the plate 130 is displaced along rails 131 and 132 and is outfitted with a moving means (not shown), the workpiece P holder module 200 being fixed in translation.

Figure 6A:
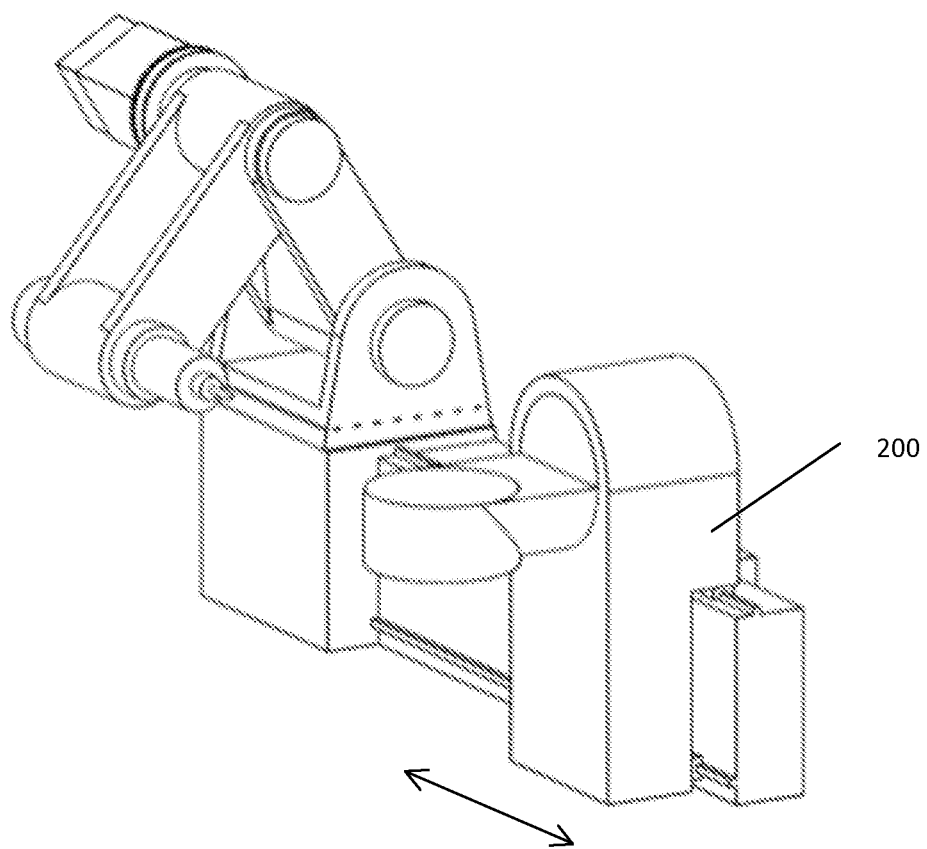
FIG. 6a is a schematic drawing of a perspective view of another embodiment of the machine tool with fixed plate and comprising a workpiece holder module.

Or, according to an embodiment as illustrated, for example, in the drawing of FIG. 6a, it is the workpiece holder module 200 which is displaced along rails and outfitted with a moving means.

The articulated structure 100 provides for the displacement of the electric spindle 300 in the vertical plane defined by the X and Y axes in movements of rotation about axes parallel to the Z axis and it is displaced in translation along the Z axis in order to bring the tool into contact with the workpiece P to accomplish the machining.

Thus, the articulated structure 100 illustrated implements only two pivot linkages and one sliding linkage along the axis of the electric spindle 300, making it possible to have a rigid structure. Such a structure in particular is able to perform with precision all the infeed machining operations by moving solely along a single axis.

In order to optimize this rigidity, each rotary axis of the articulated structure 100 is implemented with a recovery bearing which better allows for the stresses to which said rotary axes are subjected, especially during the movement of infeed translation along the Z axis. Thus, the rotary axis linking the first end 111 of the first arm 110 comprises two guide bearings 133 and 134 which are preformed in the plate 130. Likewise, the rotary axis linking the second end 112 of the arm 110 to the first end 121 of the second arm 120 comprises two guide bearings 113 and 114 which are preformed in the second end 112 of the first arm 110.

Again, for purposes of optimized rigidity, each rotary axis is placed in motion by means of a motor (140, 150) and a reducer (160, 170) of no-backlash cycloidal type, positioned directly on each axis.

In addition to this optimized rigidity, in order to allow for the deformations caused by the stresses undergone by the structure, each rotary axis is equipped with two rotary encoders 610, 620 and 630, 640. A first rotary encoder 610, 630 may be associated with the motor and reducer block (140, 160) and (150, 170) and the second one 620, 640 may be positioned as illustrated, at the end of the axis, in the area of the recovery bearing 133, 113. The distance between the two rotary encoders on each axis optimizes the precision.

The two encoders for each articulation do not have the same function. More precisely, the first rotary encoder 610, 630 associated with the motor 140, 150 upstream from the reducer 160, 170 has the function of measuring the velocity, while the second encoder 620, 640 positioned in the area of the recovery bearing 133, 113 has the function of measuring the position, taking into account the deformations.

The control unit (not shown) of the machine tool M thus manages the information coming from two encoders for each rotary axis of the articulated structure. The numerical control system associated with this control unit is thus of the type adapted to machining centers and ensuring that the desired precision criteria are met.

Figures 21, 22:
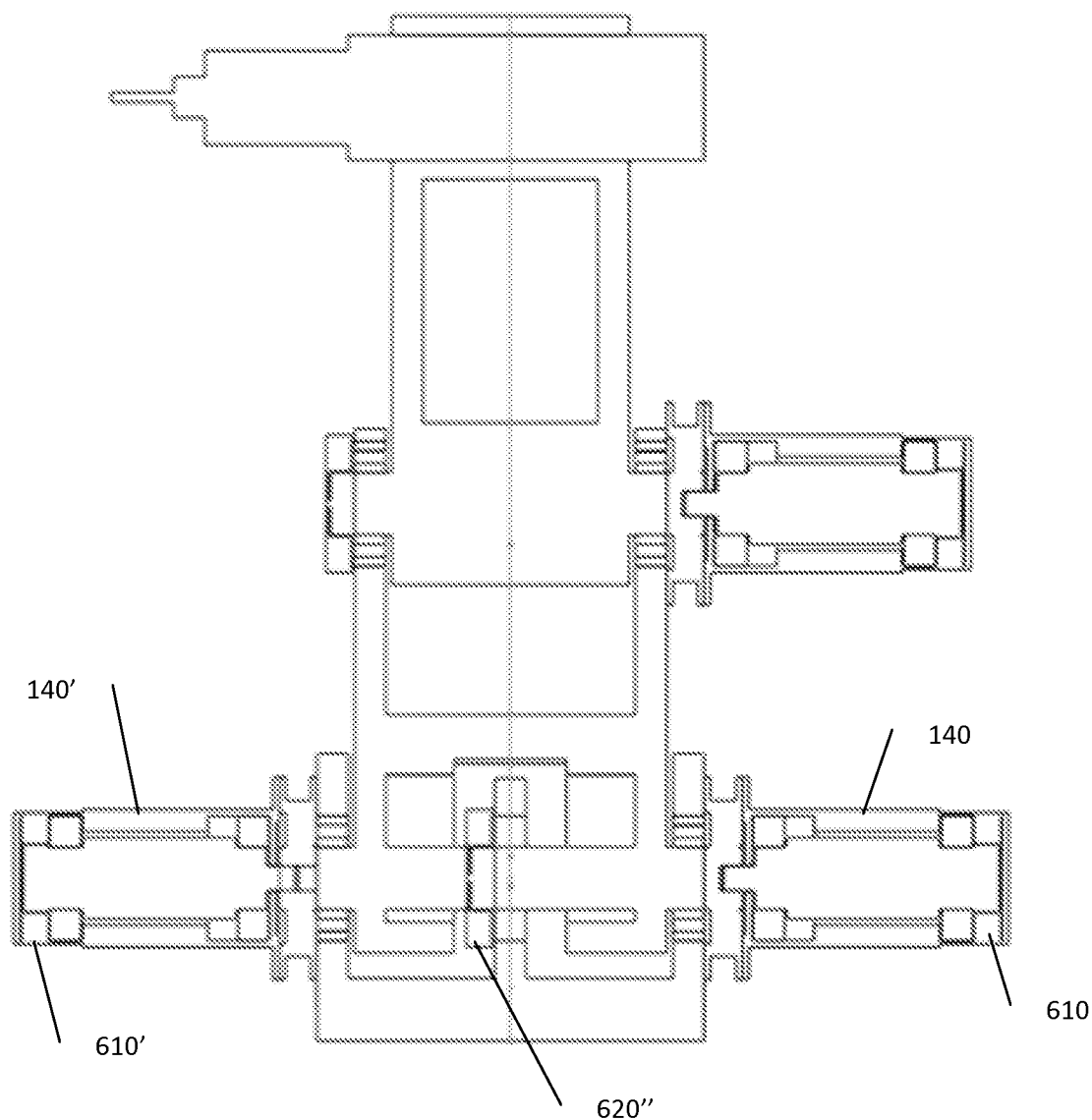
FIG. 21 is a schematic drawing of a side view in cross-section with the two arms situated in the same cross-sectional plane of another embodiment, with an articulation having two motors.
FIG. 22 is a text box which advises that the machine tool comprises a cooling circuit and/or several radiators stabilizing the kinematic structure by evacuating heat generated by the various subassemblies of which the structure is composed.

In order to provide a moving means adapted to the mass of the different elements being moved, a configuration where the movement of the lower arm 110 on the plate 130 is provided by two motors 140 and 140' is illustrated by the drawing of FIG. 21. Each motor 140, 140' comprises a velocity encoder 610, 610' situated upstream from the reducer. As illustrated, the position encoder 620" is placed in common and situated in a central position between the two bearings.

According to one embodiment, not illustrated, each pivot linkage comprises two motor-reducers.

Figure 5:
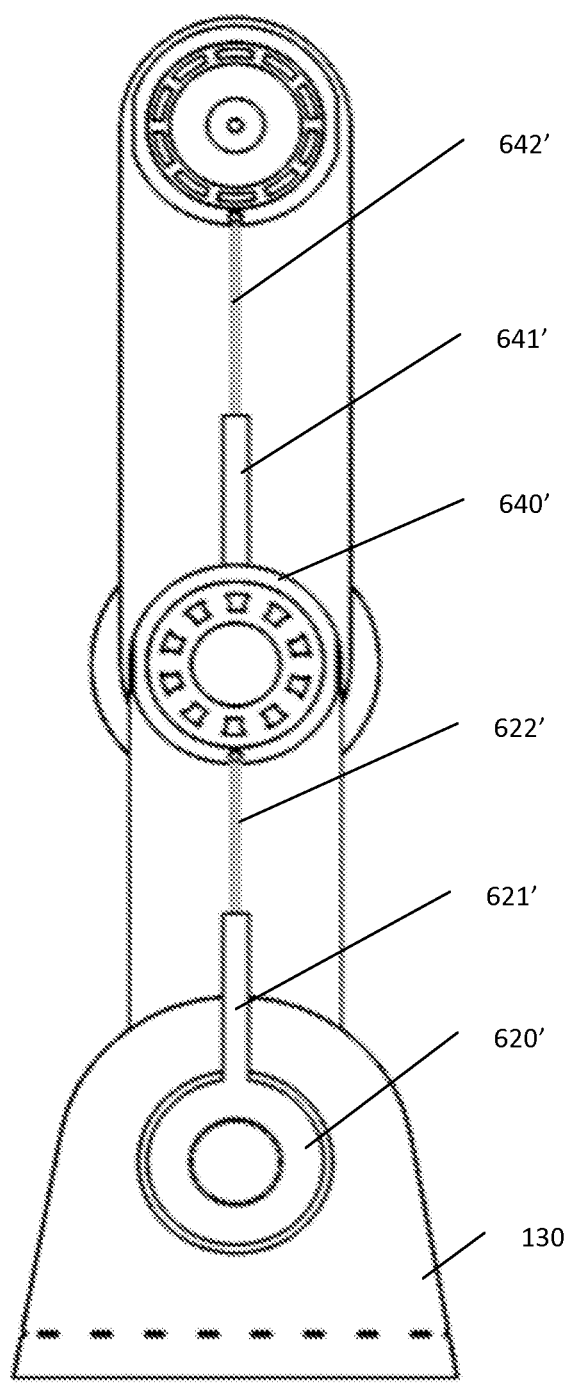
FIG. 5 is a schematic drawing of a rear view illustrating a different embodiment for the second encoder.

The quest for the most precise possible measurement of the positioning has led the patent applicant to conceive of a second encoder able to take into account for each articulation the deflection experienced by the arm with which it is associated. The embodiment illustrated by the drawing of FIG. 5 illustrates encoders 620' and 640' whose architecture takes into account the deflection of the arms.

In fact, each encoder 620' comprises a movable rotating portion whose angle of rotation is defined by the angle of rotation adopted by the distal end of the arm with respect to the encoder. To accomplish this, the rotating portion of each encoder 620' and 640' forms a sheath 621' and 641' in which a rod 622' and 642' slides, joined firmly in rotation to the distal end of the arm whose angular position is being measured. Thus, the position encoder does not simply measure the angular position of the base of the arm, but also takes into account any bending of that arm.

In order to optimize the measuring, and in accordance with the invention, the rod and sheath assembly further comprises one or more of the following sensors:
- a linear sensor measuring the deflection parallel to the axis of articulation situated at the level of the link between the rod and the distal end,
- a linear sensor measuring the radial elongation in the longitudinal direction of the arm, measuring the sliding of the rod in the sheath,
- an angular sensor measuring the torsion of said arm situated between the sheath and the rod.

According to the embodiment illustrated by the drawing of FIG. 1, the workpiece P holder module 200 is designed such that the workpiece P can be rotated about an axis parallel to the Y, Z plane and about a horizontal axis parallel to the X axis in the position of the drawing. To accomplish this, the workpiece P holder module comprises a movable workpiece P support bed 210. This movable bed 210 rotates with respect to a swing bed 220, which rotates about a horizontal axis with respect to a fixed portion 230 of the workpiece holder module 200. These different rotations enlarge the range of possible machining while keeping the advantages of the invention.

The embodiment illustrated by the drawing of FIG. 6 illustrates more precisely an implementing of the embodiment shown by the drawing of FIG. 1. The bed B is composed of a parallelepiped supporting the rails 131 and 132, at one end of which is arranged the workpiece holder module 200', being fixed. As illustrated, the structure is open and has easy access on all sides. Likewise, the footprint is reduced in size.

This embodiment shall serve as a basis for illustrating various technical effects provided by a machine tool according to the invention.

Figure 8:
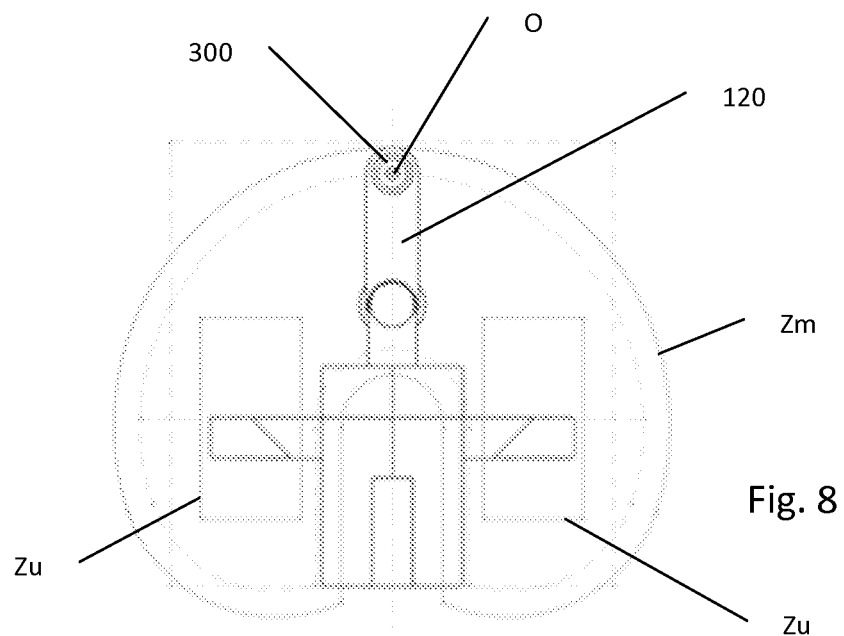
FIG. 8 is a schematic drawing of a front view of the embodiment of FIG. 7 illustrating the movement possibilities.
Figure 7:
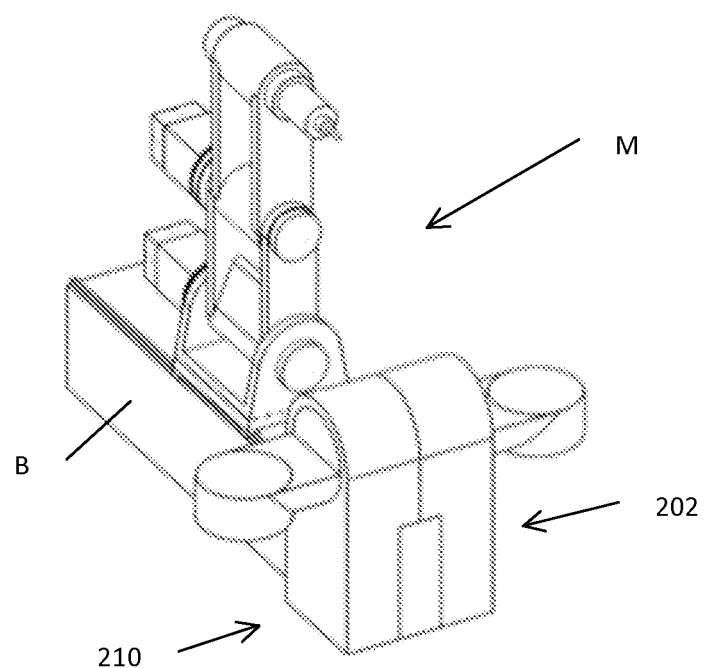
FIG. 7 is a schematic drawing of a perspective view of another embodiment of the machine tool with movable plate and comprising two workpiece holder modules.

Thus, for example, the drawing of FIG. 7 illustrates the possibilities of such a machine working with two workpiece holder modules 201 and 202 placed alongside each other and situated at the same end of the bed B. These possibilities are due to the fact of the articulated structure formed by the two arms having the movement possibilities as illustrated by the drawing of FIG. 8.

These movement possibilities are divided into two zones:
- a machining zone as illustrated by the two windows Zu arranged on either side of the bed B,
- a maintenance zone illustrated by line Zm encompassing the two machining windows.

The machining windows correspond to the positions of the spindle making it possible to achieve the desired machining criteria, especially as regards the rigidity of the structure. The maintenance zone Zm corresponds to the positions made possible by the pivot links of the articulated structure and extends, as illustrated, far beyond the machining zones Zu.

Figure 9:
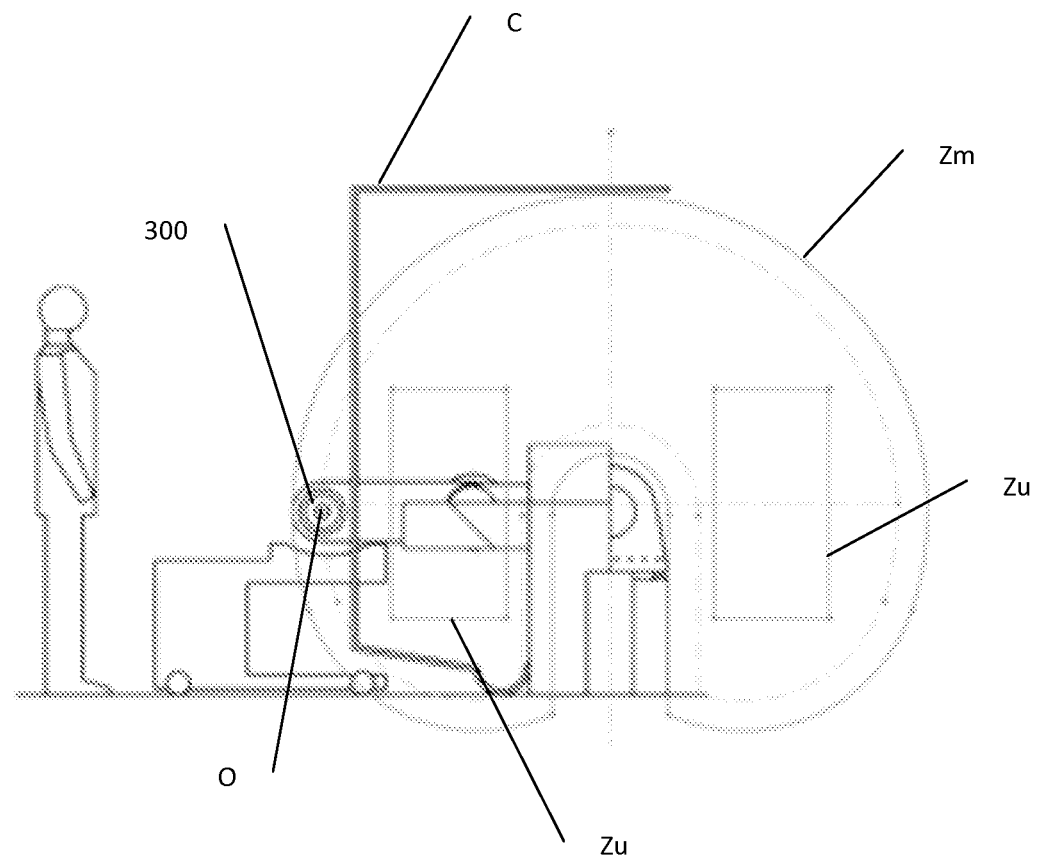
FIG. 9 is a schematic drawing of a front view of another embodiment of the machine tool of the invention comprising a casing for the machining zone and the movement possibilities.
Figure 10:
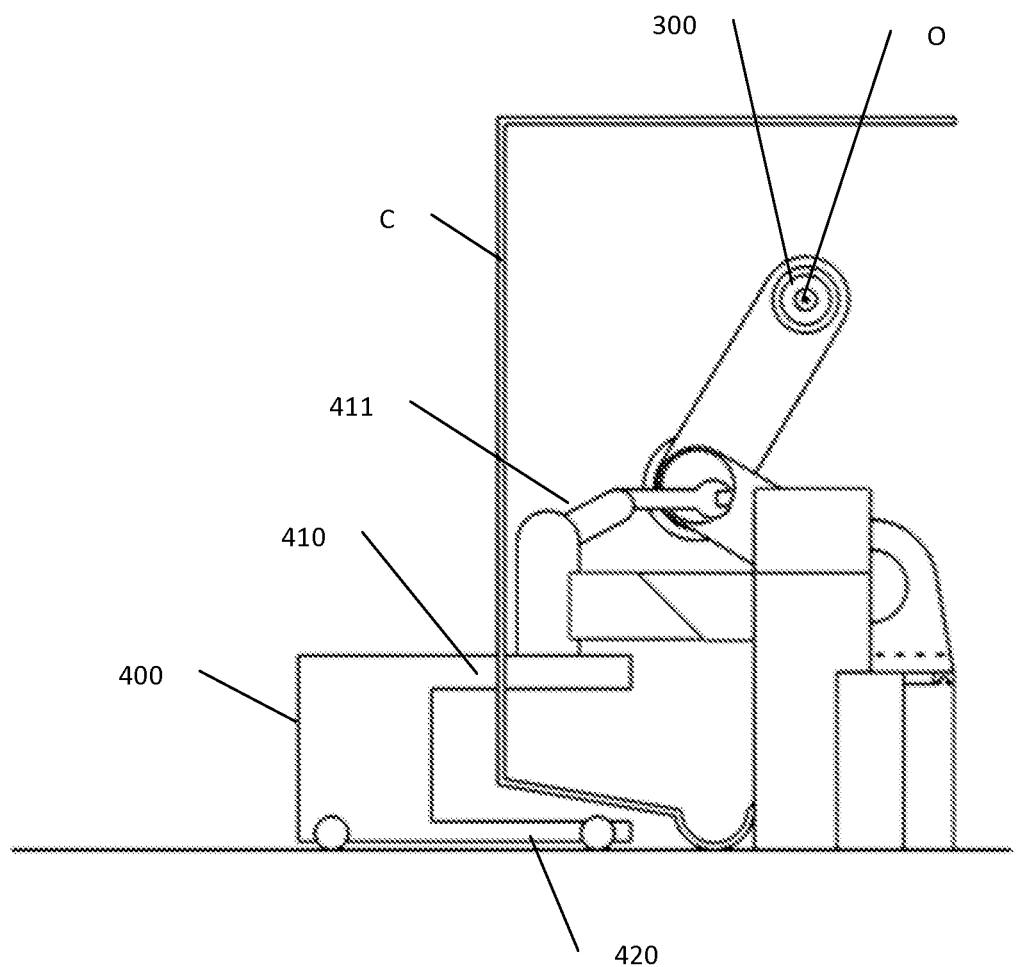
FIG. 10 is a schematic drawing of a front view of another embodiment of the machine tool of the invention comprising a casing.

The positioning possibilities provided by the articulated structure thus make it possible to outfit the machine tool M with a casing C to protect the machining zone Zu, such as that illustrated by the drawings of FIGS. 9 and 10. As illustrated in the drawing of FIG. 9, the electric spindle may exit from the casing C to undergo a maintenance procedure.

As illustrated in the drawing of FIG. 10, the machine tool M comprises a self-guided slide 400 which partially enters into the zone protected by the casing C. In order to do so, this slide 400 is in the form of a bracket 410 supporting a functional maintenance module 411 secured to platform on wheels 420. In order to support the bracket 410, said slide on wheels 420 has a ground surface equivalent to the projection of said bracket. In order to allow the end of the bracket 410 to enter into the zone protected by the casing C, the latter is raised with respect to the surface over which the slide is moving in order to allow the movement of said slide 400 without obstacles. As illustrated in this drawing, the functional maintenance module can reach the two articulations of the machine tool thanks to the positioning possibilities of the articulated structure.

Figure 19:
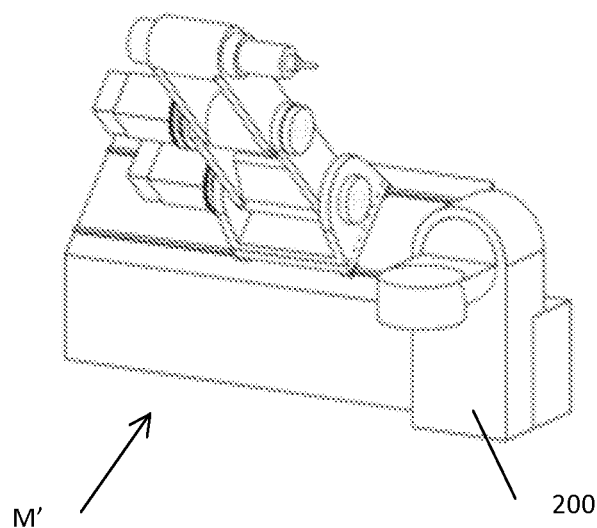
FIG. 19 is a schematic drawing of a perspective view of another embodiment of a machine tool according to the invention.

This positioning flexibility also makes it possible to propose a machine tool M' whose plate 130 moves along a plane inclined at 45 degrees, as illustrated in the drawing of FIG. 19.

Figure 20:
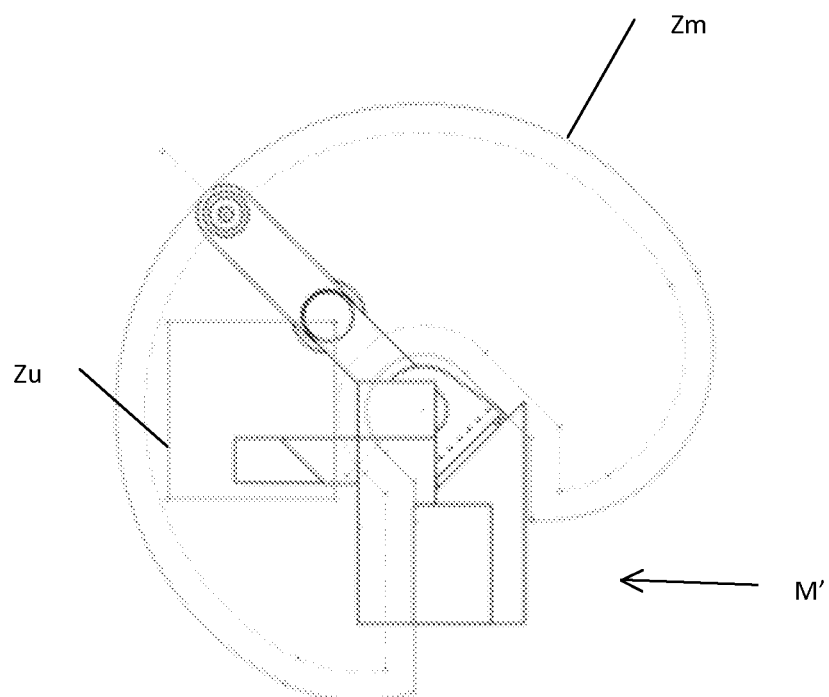
FIG. 20 is a schematic drawing of a front view illustrating the movement possibilities of the articulated structure of the machine tool of FIG. 19.

FIG. 20 illustrates the movement possibilities of such a machine M', providing a great flexibility in the positioning possibilities, for example of a tool magazine.

Figure 16:
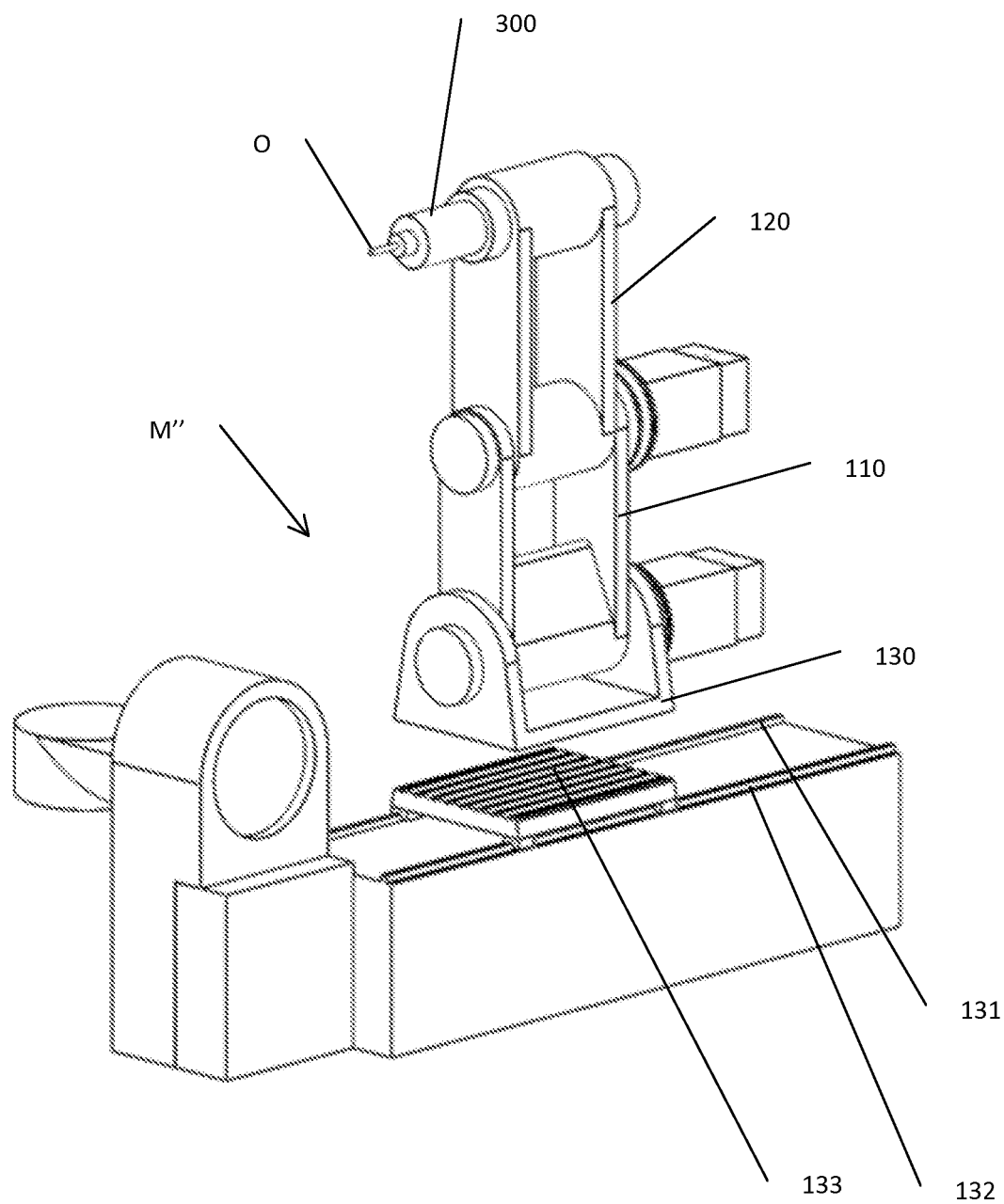
FIG. 16 is a schematic drawing of the embodiment of FIG. 6 in a detachable version.

The embodiment illustrated by the drawing of FIG. 16 illustrates another characteristic of the invention which provides an interchangeability of the moving structure of the machine tool M ' '. Thus, the assembly formed by the plate 130, the two arms 110 and 120 and the electric spindle 300, is secured so as to facilitate its interchangeability to a bed 133 sliding on the rails 131 and 132.

Figure 17:
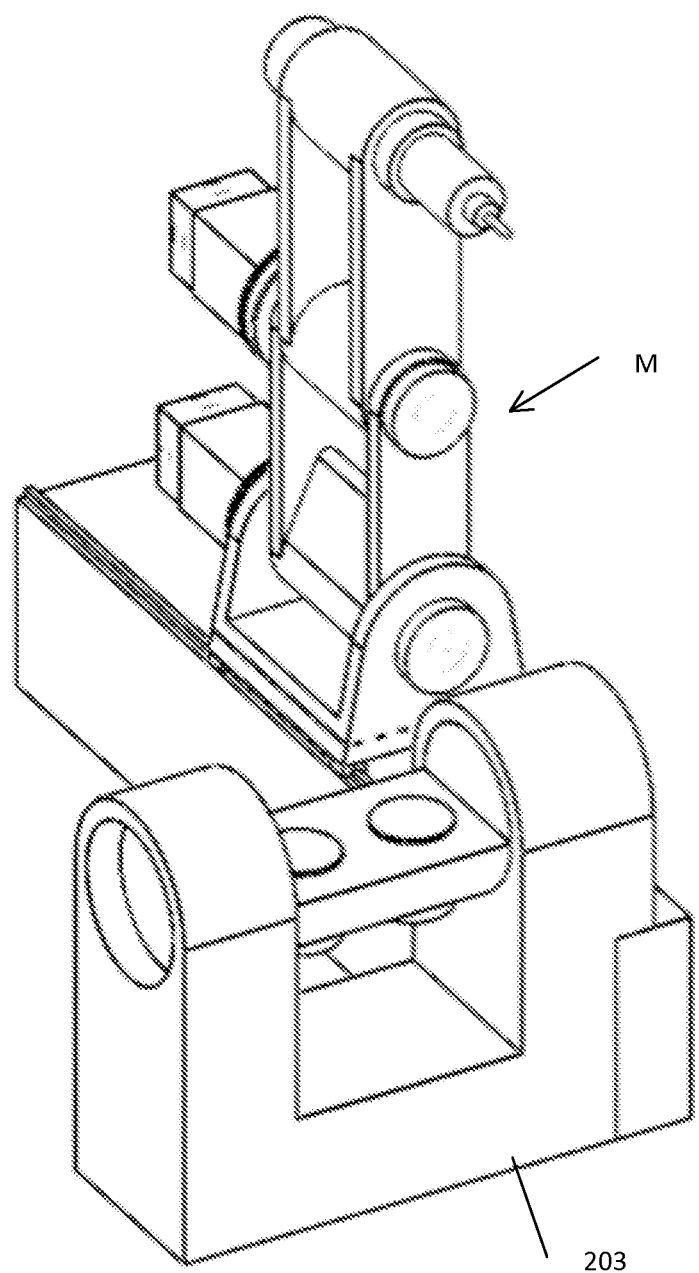
FIG. 17 is a schematic drawing of another embodiment of a machine tool according to the invention.

As illustrated in the drawing of FIG. 17, the machine tool M can be combined with a workpiece holder module 203 of swing-tray type carrying several workpieces.

Figure 18:
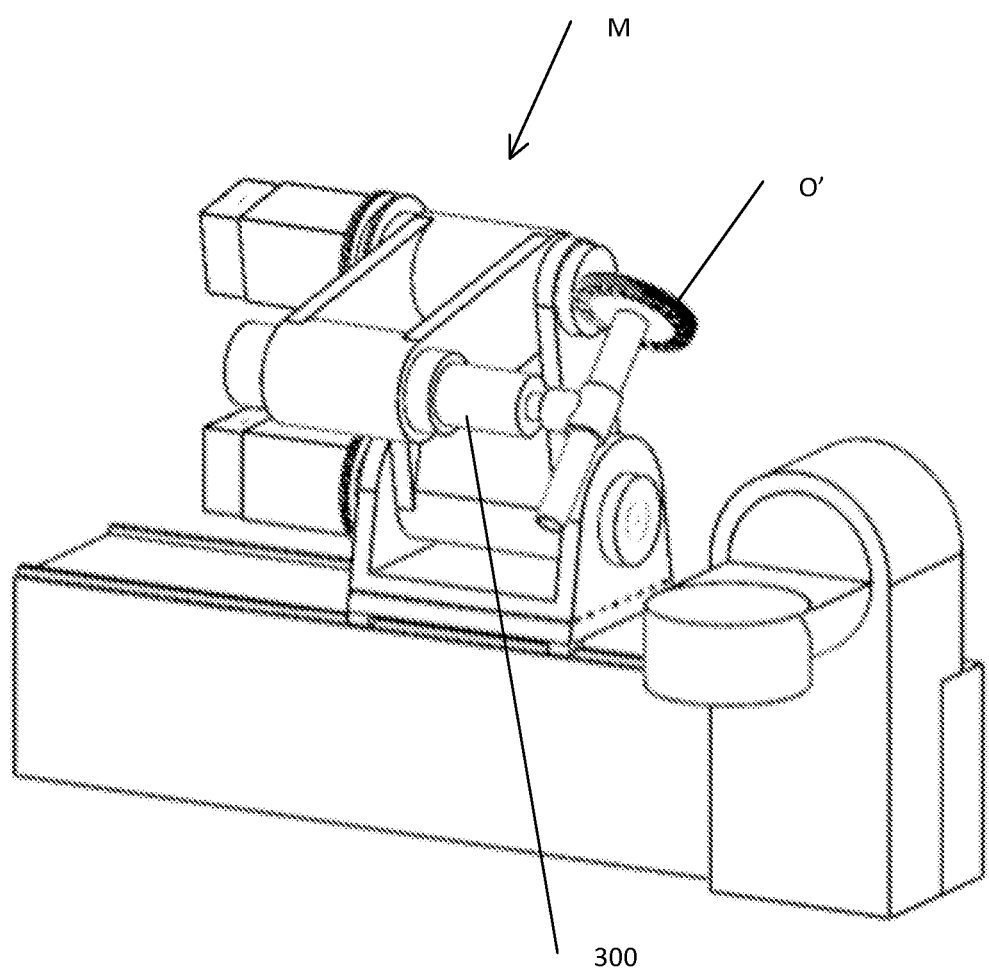
FIG. 18 is a schematic drawing of the embodiment of FIG. 6 equipped with a cleaning means.

The drawing of FIG. 18 illustrates an original exploitation of the movement possibilities of the machine tool M by outfitting the electric spindle 300 with a brush O'. According to the various possibilities already discussed, the brush O' may provide for the cleaning of both the encased machining zone and the maintenance zone.

The accessibility of the machine tool of the invention makes possible a plurality of configurations when they need to be combined with each other.

Figure 11:
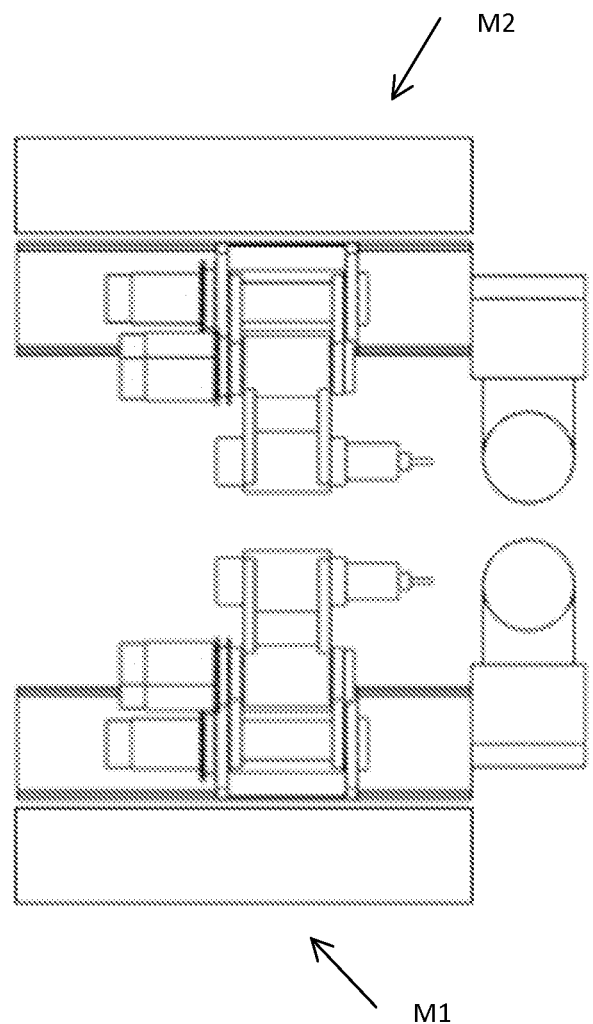
FIG. 11 is a schematic drawing of a top view of two machine tools according to the invention in side-by-side juxtaposition.

A first example of a combination of two machine tools according to the invention is illustrated by the drawing of FIG. 11, where the machine tools M1 and M2 are placed side by side and have a symmetrical configuration.

Figure 12:
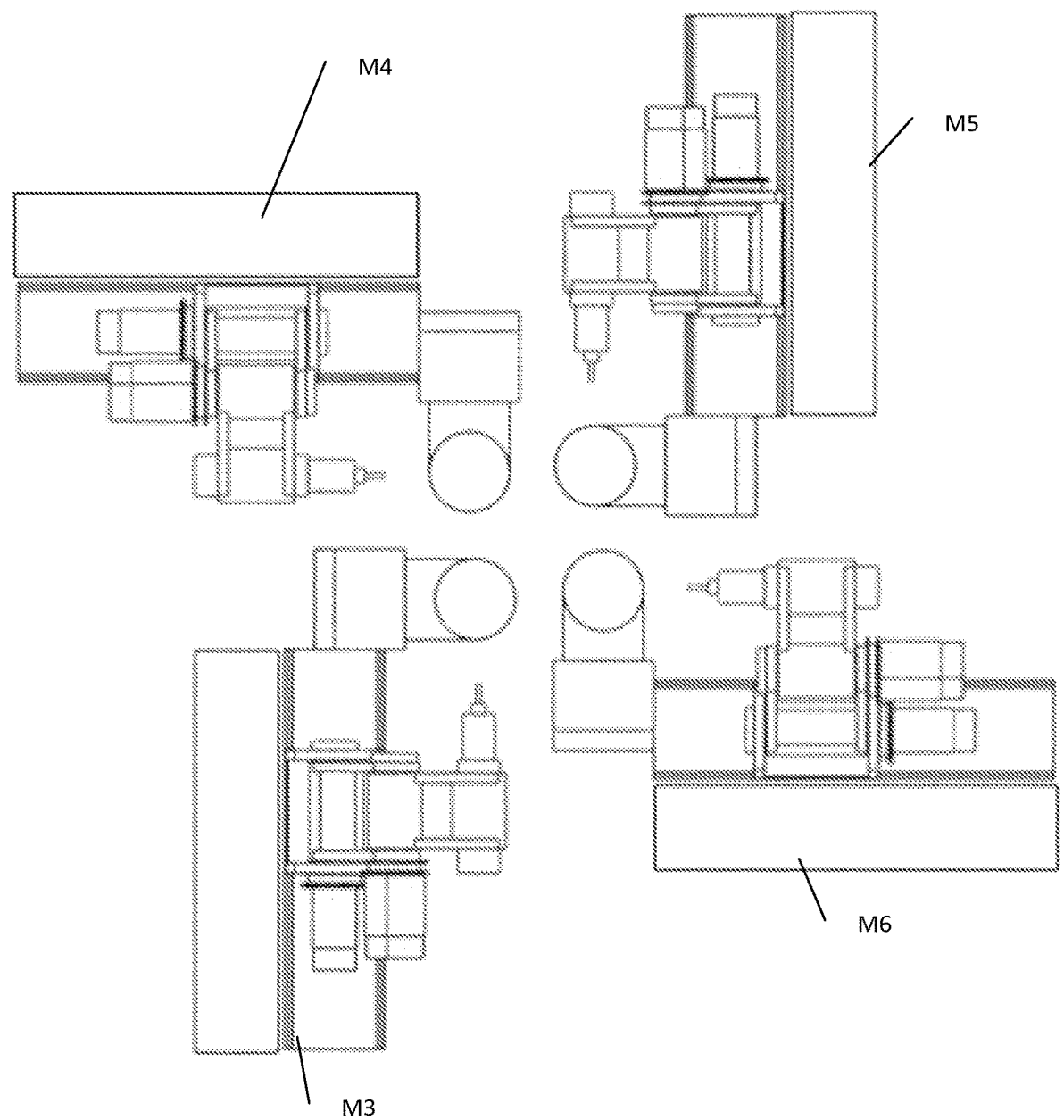
FIG. 12 is a schematic drawing of a top view of four machine tools according to the invention arranged in a star pattern with their machining zone at the center.

Another example of a combination of four machine tools according to the invention is illustrated by the drawing of FIG. 12, where the four machine tools M3, M4, M5 and M6 are identical and arranged in a star pattern at 90 degrees from each other around a center where the workpiece holder modules are positioned.

Figure 13:
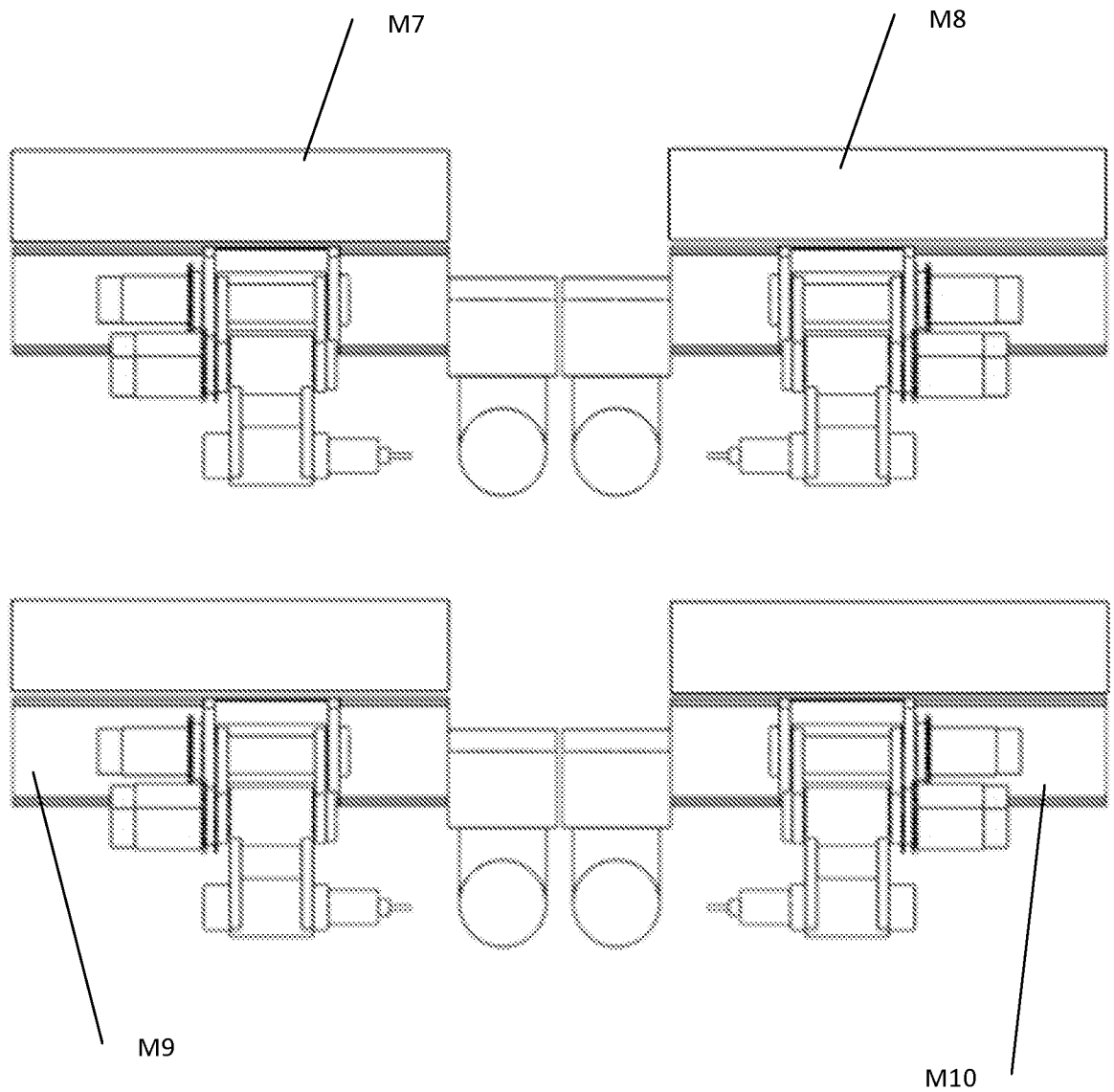
FIG. 13 is a schematic drawing of a top view of four machine tools according to the invention arranged symmetrically in two-by-two opposition as two linear cells with the machining zone at the center of the cells.

Another example of a combination of four machine tools according to the invention is illustrated by the drawing of FIG. 13, where the four machine tools M7, M8, M9 and M10 are arranged symmetrically in opposition two by two in two linear cells with the machining zone situated at the center of the linear cell.

Figure 14:
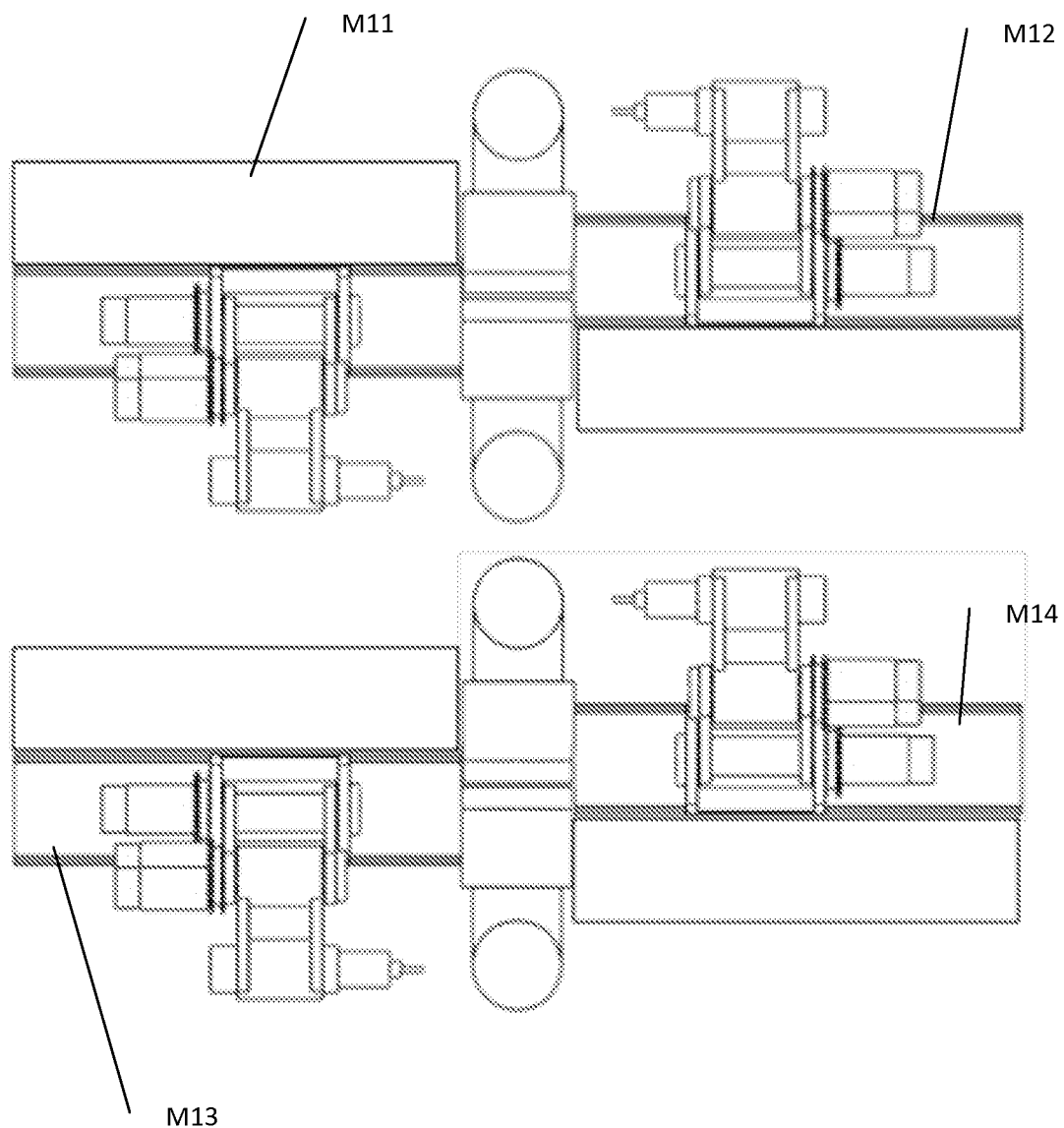
FIG. 14 is a schematic drawing of a top view of four machine tools according to the invention arranged in two-by-two opposition as two linear cells.

Another example of a combination of four machine tools according to the invention is illustrated by the drawing of FIG. 14, where the four machine tools M11, M12, M13, M14 according to the invention are arranged in opposition two by two in two linear cells.

The foregoing combinations have the purpose of providing the most compact configuration possible, to facilitate the maintenance and to centralize the machining zones.

Figure 15:
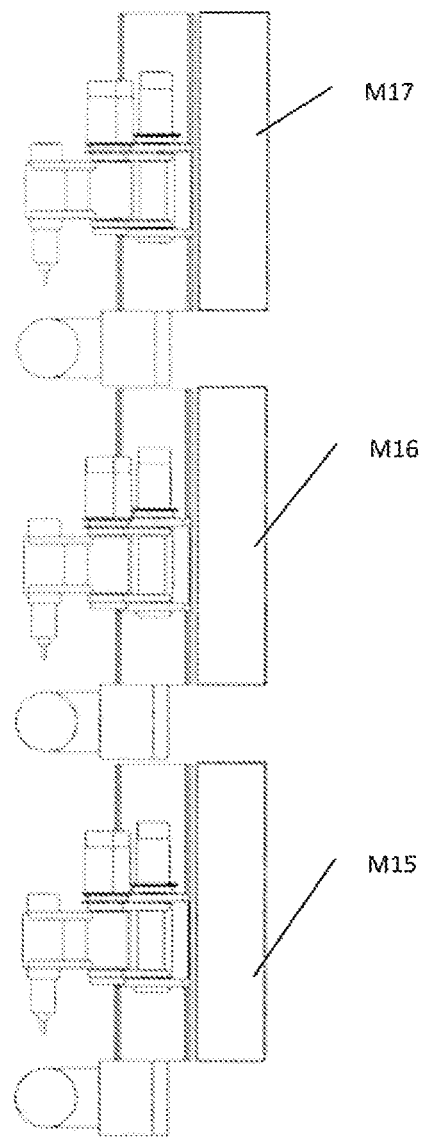
FIG. 15 is a schematic drawing of a top view of three machine tools according to the invention arranged in a linear cell.

The combination in a linear aligned cell of three identical machine tools M15, M16 and M17 as illustrated by the drawing of FIG. 15 provides machining zones and workpiece holder modules disposed on the same side in order to facilitate access and enable, for example, a combination with a self-guided slide.

As shown in FIG. 22, the machine tool comprises a cooling circuit and/or several radiators stabilizing the kinematic structure by evacuating heat generated by the various subassemblies of which the structure is composed. As shown in FIG. 22, in one or more embodiments of the present disclosure, the machine tool comprises a cooling circuit and/or serveral radiators that stabilize the kinematic structure by evacuating heat generated by the various subassemblies of which the structure is composed, such as motors, reducers, electric spindle, rotary axes, etc.

It will be understood that the machine tool just described and represented has been done for the purpose of a disclosure, rather than a limitation. Of course, various arrangements, modifications and improvements could be made in the examples above, without exceeding the scope of the invention.

Thus, for example, a tool magazine with or without a tool changer system may complement the embodiments described above.

The invention claimed is:

1. A machine tool (M) comprising a kinematic structure (100) that moves an electric spindle (300) carrying a cutting tool (O), the cutting tool (O) rotating about an axis of the electric spindle (300),
the kinematic structure (100) moving the electric spindle (300) in a positioning plane perpendicular to the axis of the electric spindle (300), the machine tool (M) further comprising a workpiece support module (200),
wherein said kinematic structure (100) positions the electric spindle in said positioning plane and is an articulated structure comprising two articulated arms (110, 120), including:
a first arm (110) having two ends (111, 112), a first end (111) of the two ends (111, 112) of the first arm (110) being mounted to pivot in relation to a plate (130) about a first axis of rotation that extends parallel to the axis of the electric spindle (300), and wherein a first means for driving in rotation (140) comprises a rotating shaft motor that ensures movement of the first arm (110) about the first axis of rotation, and
a second arm (120) having two ends (121, 122), a first end (121) of the two ends (121, 122) of the second arm (120) being mounted to pivot in relation to a second end (112) of the two ends (111, 112) of the first arm (110) about a second axis of rotation that extends parallel to the axis of the electric spindle (300), and wherein a second means for driving in rotation (150) comprises a rotating shaft motor that ensures movement of the second arm (120) about the second axis of rotation,
the second end (122) of the second arm (120) receiving the electric spindle (300),
the machine tool configured to perform a machining by a relative translation movement of the workpiece (P) in relation to the tool (O) of the electric spindle (300) positioned and held fixed by the kinematic structure in said positioning plane,
the relative translation movement of the workpiece (P) in relation to the tool (O) of the electric spindle (300) in a linear movement parallel to the axis of the electric spindle (300) being brought about by the workpiece support module (200) or by a plate support module;
wherein two encoders are associated with each of the first and second axis of rotation of said articulated structure (100), and wherein the two encoders do not have the same functions, a first encoder of the two encoders being used to measure speed, while a second encoder of the two encoders measures position for the associated axis of rotation, and
where each rotating shaft motor comprises a respective reducer, wherein the first encoder for each of the first and the second axis of rotation is associated with the motor upstream from the corresponding reducer and provides for measuring the speed and the second encoder is associated with a bearing and provides for measuring the position, and the second encoder for measuring the position comprises, for at least one arm, a rod sliding in a sheath and able to measure an angular position of the other end of the at least one arm.

2. The machine tool (M) according to claim 1, wherein two respective bearings are positioned about each of the first and second axis of rotation of said articulated structure.

3. The machine tool (M) according to claim 2, wherein for each of the first and second axis of rotation, one of the two respective bearings that is associated therewith is a recovery bearing, and wherein each recovery bearing supports one second encoder.

4. The machine tool (M) according to claim 1, wherein a means for movement having a cycloidal reducer without backlash is positioned about each of the first and second axes axis of rotation of said articulated structure.

5. The machine tool (M) according to in claim 1, wherein the machine tool (M) comprises a cooling circuit and/or radiators stabilizing the kinematic structure (100) by evacuating heat generated by the machine tool (M).

6. The machine tool (M) according to in claim 1, wherein said workpiece support module (200) comprises one or more rotary axes for orienting the workpiece (P).

7. The machine tool (M) according to in claim 1, wherein positions adopted by the electric spindle (300) are divided into two zones including a machining zone and a maintenance zone, wherein the electric spindle (300) may undergo a variety of operations outside of machining, and the mobility provided by the articulated structure allows the electric spindle (300) to go beyond the machining zone.

8. The machine tool (M) according to claim 1, wherein the plate is inclined.

9. The machine tool (M) according to in claim 1, wherein the plate is connected to a frame by means of a quick-change coupling interface.

10. The machine tool (M) according to claim 1, wherein the rod sliding in the sheath further comprises one or more of the following sensors:
a linear sensor measuring a deflection parallel to an axis of articulation,
a linear sensor measuring a radial elongation in the longitudinal direction of the at least one arm, and
an angular sensor measuring a torsion of said at least one arm.

11. The machine tool (M) according to claim 1, wherein at least one of the two articulated arms (110, 120) comprises two motors.

12. The machine tool according to claim 1, wherein the machine tool (M) further comprises a self-guided slide which cooperates with the articulated structure.

13. Method A method of machining with the machine tool according to claim 1, wherein the method of machining comprises:
providing the machine tool (M) according to claim 1,
dividing axes of displacement between the first and second axes of rotation implemented by the articulated structure and a working axis implemented by the relative translation movement, and
performing the machining by the relative translation movement of the workpiece (P) with respect to the tool (O) of the electric spindle (300) positioned and held fixed by the kinematic structure in said positioning plane.

* * * * *